United States Patent [19]
Cayton, Jr.

[11] 3,838,456
[45] Sept. 24, 1974

[54] TAPE HEAD INDEXING AND SHIFTING APPARATUS

[75] Inventor: Thomas C. Cayton, Jr., Chicago, Ill.

[73] Assignee: Motorola, Inc., Franklin Park, Ill.

[22] Filed: May 14, 1973

[21] Appl. No.: 359,654

Related U.S. Application Data

[62] Division of Ser. No. 186,160, Oct. 4, 1971, Pat. No. 3,781,018.

[52] U.S. Cl. .................................................. 360/78
[51] Int. Cl. ...................... G11b 21/08, G11b 23/04
[58] Field of Search ........... 274/4 A; 179/100.2 CA, 179/100.2 Z

[56] References Cited

UNITED STATES PATENTS 3,628,796 12/1971 Ban .................................... 274/4 A
3,684,840 8/1972 Ban .................................... 274/4 A

*Primary Examiner*—William D. Martin, Jr.
*Assistant Examiner*—A. Jason Mirabito
*Attorney, Agent, or Firm*—Mueller, Aichele & Ptak

[57] ABSTRACT

Apparatus utilizing the capstan flywheel of a multi-track tape recorder and/or reproducer to power apparatus for shifting the transducer head from one tape track to another, including gear means linking the flywheel to the cam which shifts the position of the transducer head, and a solenoid activated at the end of a tape track, causes engagement of the gear linkage, and means for automatically disengaging the shifting apparatus after the transducer head has been shifted and readying the same for future shifting.

8 Claims, 2 Drawing Figures

PATENTED SEP 24 1974

3,838,456

TAPE HEAD INDEXING AND SHIFTING APPARATUS

CROSS-REFERENCE TO RELATED APPLICATION

This application is a division of application Ser. No. 186,160, filed Oct. 4, 1971, now U.S. Pat. No. 3,781,018, issued Dec. 25, 1973, and assigned to the assignee of this application.

BACKGROUND OF THE INVENTION

Multi-track tape recorders and/or reproducers require shifting either the transducer head of the recorder and/or reproducer from one tape track to another or shifting the tape itself. In practice the head is mechanically shifted from one tape track to another by either manual or automatic means. Manual switches for shifting the position of the transducer head necessarily cannot provide automatic and continuous playing of all the tape tracks.

Automatic shifting can provide continuous playing of all tape tracks with an electromechanical apparatus employed which generally includes a ratchet secured to the cam and a pawl activated by a plunger-solenoid for operating the ratchet to shift the head position. The total power for driving the pawl and ratchet, and thus for shifting the transducer head, comes directly from the solenoid. In order to provide this power the solenoid has to be relatively large and therefore expensive. This type of device may also result in unsatisfactory power drainage, for in order to provide sufficient force a large current is needed. Space requirements for the high power solenoid and related apparatus presents an additional problem.

SUMMARY OF THE INVENTION

It is an object of the present invention to provide improved apparatus for utilizing the capstan flywheel device of a multi-track tape recorder and/or reproducer for shifting the transducer head from one tape track to another.

It is another object of the present invention to provide apparatus requiring less electrical power than normally required for actuating apparatus for shifting the transducer head from one tape track to another in a multi-track tape recorder and/or reproducer.

It is a further object of the present invention to provide economical apparatus for shifting the transducer head of a multi-track tape recorder and/or reproducer, which requires less space than normally required for shifting apparatus.

Briefly, in the instant invention a first gear rotatably mounted to the capstan flywheel shaft is engageable both with a second gear, which is rotatably connected to the cam shaft, and a third gear coaxially connected to the second gear by springs. Both second and third gears have corresponding alternating segments of gear teeth and recesses. An actuating device includes an arm and pawl for engaging the gear teeth of the third gear. A solenoid when activated causes the arm to slidably move along a pivot rod and pivot thereon due to the action of a single spring having one end secured to the arm and the other anchored. This action causes engagement of the pawl with the gear teeth of the third gear which is rotated until a segment of gear teeth engages the first gear after which the solenoid is deactivated and the spring acts to return the arm to the inactive position. Corresponding tabs project from the interfaces of both the second and third gears. These corresponding tabs are joined together by spring means. With the third gear rotating, the tabs thereon cause the springs to compress and effectively engage the tabs of the second gear. The second gear then rotates with the third gear until a gear segment of the second gear engages the first gear at which time the second gear is driven by the flywheel and a toothless segment of the third gear disengages the third gear from the flywheel gear permitting the spring to expand to effectively disengage the second and third gears. A toothless segment of the second gear then disconnects the gear from the first gear with the cam having been shifted to a new position.

DETAILED DESCRIPTION

Figure 1:
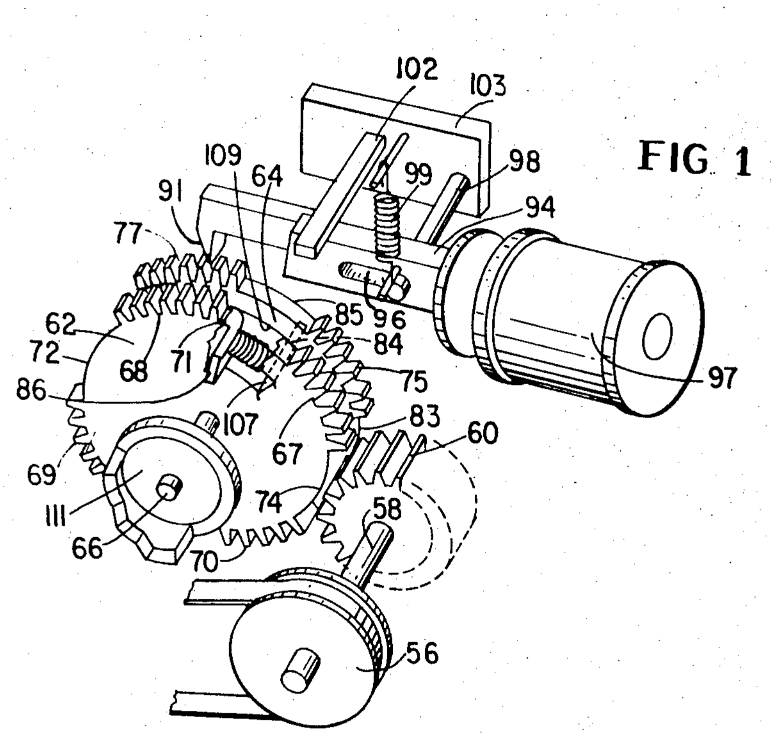
FIG. 1 is a perspective view of the present invention.
Figure 2:
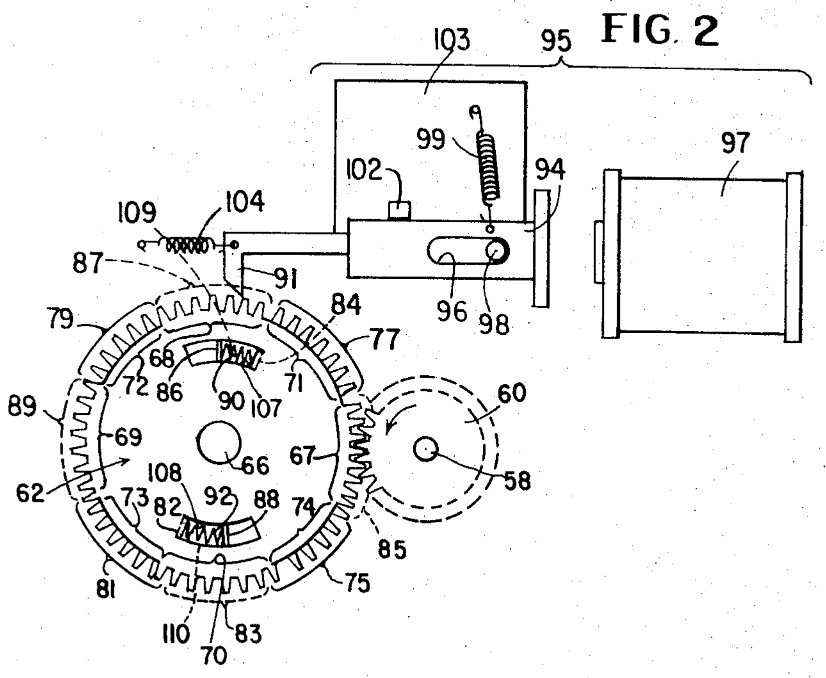
FIG. 2 is a top plan view of the invention shown in FIG. 1.

Referring to FIGS. 1 and 2, there is illustrated a gear assembly which is utilized to link the capstan flywheel drive of a multi-track tape player to the player tape head positioning cam. A gear 60 is rotatably mounted on the capstan shaft 58 in a spaced relation to gears 62 and 64. Both gears 62 and 64 have meshed and unmeshed conditions with gear 60, which is continuously being driven by the flywheel 56. Gear 62 is rotatably connected to the cam shaft 66 and has alternating segments of gear teeth 67, 68, 69, 70 and recesses 71, 72, 73, 74. Gear 64, however, is not connected to the cam shaft. It is in approximate coaxially spaced relation to gear 62 in a loose fit around the cam shaft. Gear 64 has alternating sections of gear teeth 75, 77, 79, 81 and recesses 83, 85, 87, 89. Normally the number and size of the gear teeth segments and recess segments of gear 64 equals those of gear 62. Tabs 82 and 84 project inwardly from gear 62 toward gear 64, while the tabs 86 and 88 of gear 64 project outwardly toward gear 62. Windows 107 and 108 in gear 62 and windows 109 and 110 in gear 64 are provided for receiving the springs 90 and 92 which are secured to tabs 86 and 84 and 88 and 82 respectively. Gear 64 is turned by actuating means 95 with gear 62 and the cam shaft 66 remaining inactive. The springs 90 and 92 are compressed with the teeth 75 of gear 64 engaging gear 60 and rotating clockwise. The compression of the springs 90 and 92 eventually overcomes the inertial of gear 62 with the tabs effectively abutting against each other, tab 86 with tab 84, and tab 88 with tab 82. Gear 62 then rotates in the same direction and in conjunction with gear 64 and a gear tooth segment 67 of gear 62 engages gear 60. Gear 64 then continues engagement with gear 60 until a recessed portion 85 of gear 64 is reached (FIG. 2). Upon reaching the recessed portion gear 64 is no longer meshed with gear 60 and stops rotating. Gear tooth segment 67 of gear 62 however continues to mesh with gear 60 until it reaches recessed segment 71, at which time it too becomes disengaged and no longer rotates. The shifting of the transducer head by the cam 111 and cam shaft 66 is complete and the apparatus is unlinked and in position for again shifting the head.

Actuating means 95 for rotating gear 64 includes a pawl 91 which engages gear teeth of gear 64 in the engaged condition. The pawl is attached to a level arm 94 which has a slot 96 slidably mounted on a pivot rod 98. A spring 99 (FIGS. 1 and 2) for returning the arm 94 to the inactive position is connected to the arm near the resting position of the pivot rod. It is connected to plate 103 at a slight angle of approximately 5° to 10° from a perpendicular to the arm 94 and biases the arm 94 against the stop 102 which, along with pin 98, is secured to a plate 103. The actuating arm 94 is activated by a small solenoid 97 causing the lever arm to slide from left to right (FIG. 1) with the slot 96 engaging pivot pin 98 and spring 99 causing the level arm to pivot on pivot pin 98 with pawl 91 engaging the teeth 77 of gear 64. Upon disengagement of the solenoid the lever arm is returned to its original position by spring 99, thus readying the apparatus for again shifting the transducer head.

A second spring 104 shown in FIG. 2 can be added to more positively return the actuating arm to the inactive position with the solenoid 97 turned off.

The driving force for shifting the cam means comes solely from the capstan flywheel driver, which continues to turn even with the shifting means disengaged. The only power expended in shifting the head in addition to that derived from the flywheel is the solenoid power required to attract arm 94 to the solenoid 97. The tension of the spring 99 controls the amount of power necessary, and thus also the size of the solenoid. Consequently in comparison to conventional shifting devices utilizing a pawl and ratchet assembly requiring continuous electrical power for shifting the transducer head, the size of the solenoid of the present invention may be substantially reduced. The short term use of the solenoid also reduces power consumption.

What has been disclosed then, is an efficient compact apparatus which utilizes the capstan flywheel device of a multi-track tape recorder and/or reproducer for shifting the transducer head from one tape track to another thereby reducing the amount of electrical power normally used for similar types of head shifting apparatus.

I claim:

1. In a magnetic tape player adapted to use a multi-track tape therein, and including a rotatable cam having a plurality of different cam surfaces each one of which is associated with a different track on the tape for positioning the magnetic tape head to the different tracks on the tape, and a capstan shaft for driving the tape in the player past the magnetic tape head, the improvement characterized by:

- a first rotatable coupling member positioned in a spaced relation to the capstan shaft and coaxially aligned with the rotatable cam,
- a second coupling member rotatably mounted on and driven by the capstan shaft,
- actuating means actuable upon the completion of a playing of one track on the tape to engage said first rotatable coupling member with said second coupling member for rotating the first rotatable coupling member with the capstan shaft,
- a third rotatable coupling member connected to the rotatable cam and engageable with said first coupling member, said third coupling member being selectively engageable with said second coupling member such that after a relatively brief rotation of said first coupling member by said second coupling member said first member engages said third member to cause said second coupling member to engage and rotate said third coupling member and the cam to position the tape head to the next track on the tape, and
- means for disengaging said third rotatable coupling member from said second coupling member upon the completion of positioning the tape head to the next track on the tape.

2. The magnetic tape player according to claim 1 wherein said actuating means includes a magnetic arm having a pawl at one end, a solenoid, and pivot means for positioning said arm and said pawl, said magnetic arm being movable about said pivot means towards said solenoid when said solenoid is energized and said pawl being engageable with said first rotatable coupling member for rotating the same with the capstan shaft.

3. The magnetic tape player according to claim 2 wherein said actuating means further includes a first spring member connected to said arm for maintaining engagement of said pawl with said first rotatable coupling member.

4. The magnetic tape player according to claim 1 wherein said first and third coupling members each having multiple gear teeth segments on their peripheral edge thereof and tabs projecting substantially axially therefrom, said tabs being engageable with each other during rotation of said first coupling member.

5. The magnetic tape player according to claim 4 wherein means for disengaging includes a spring mounted between said tabs of said first and third coupling members, such that when said first coupling member is rotated, said spring is compressed by said tabs during engagement of each other, said spring returning said tabs of said first and third coupling members to an unactuated condition upon the completion of positioning the tape head to the next track on the tape.

6. In a multi-track magnetic tape player apparatus for utilizing the capstan flywheel drive for shifting the transducer head from one tape track to another including in combination:

- a capstan flywheel drive;
- a first gear rotatably mounted on said flywheel drive;
- cam means for shifting the position of the transducer from one tape track to another;
- a second gear rotatably connected to said cam means for linking said first gear to said cam means, said second gear having multiple gear teeth segments along its periphery and a tab projecting substantially axially therefrom;
- a third gear coaxially aligned with respect to said second gear and having a tab projecting axially therefrom, said tabs of said second and third gears being positioned for effectively abutting one another with one of said gears being rotated;
- a spring connected between said tabs of said second and third gears for mounting said second gear, said third gear tab effectively abutting against said second gear tab with said spring being compressed, and said third gear rotating said second gear with said second gear thereby engaging said first gear;
- said first gear being disengaged from a segment of gear teeth of said third gear with a gear teeth segment of said second gear being engaged by said first gear, said tabs separating with said spring decompressing, and thereafter gear teeth segments of both said second gear and third gear being disengaged from said first gear in said inactive condition; and an actuator for engaging a segment of gear teeth of said gear with said first gear.

7. Apparatus according to claim 6 wherein said actuator comprises:

an arm having a pawl at one end for engaging said third gear for advancing the same, said arm having a cam and having magnetic properties;

a pivot pin engaging said cam for longitudinal and rotational movement of said arm;

a solenoid activated for moving said arm and thereby advancing said third gear until said third gear engages said first gear;

a spring connected to said arm for maintaining engagement of said pawl with said third gear and returning said pawl to an inactive position with said solenoid being deactivated;

and a stop maintaining slideable return of said arm and preventing said pawl from being shifted away from said third gear.

8. Apparatus according to claim 7 wherein said actuator includes a second spring for positive return of said pawl to its inactive condition.

* * * * *